No. 697,711. Patented Apr. 15, 1902.
A. GILLARDUZZI.
BAND SAW GUIDE AND TENSION DEVICE.
(Application filed June 5, 1901.)
(No Model.)
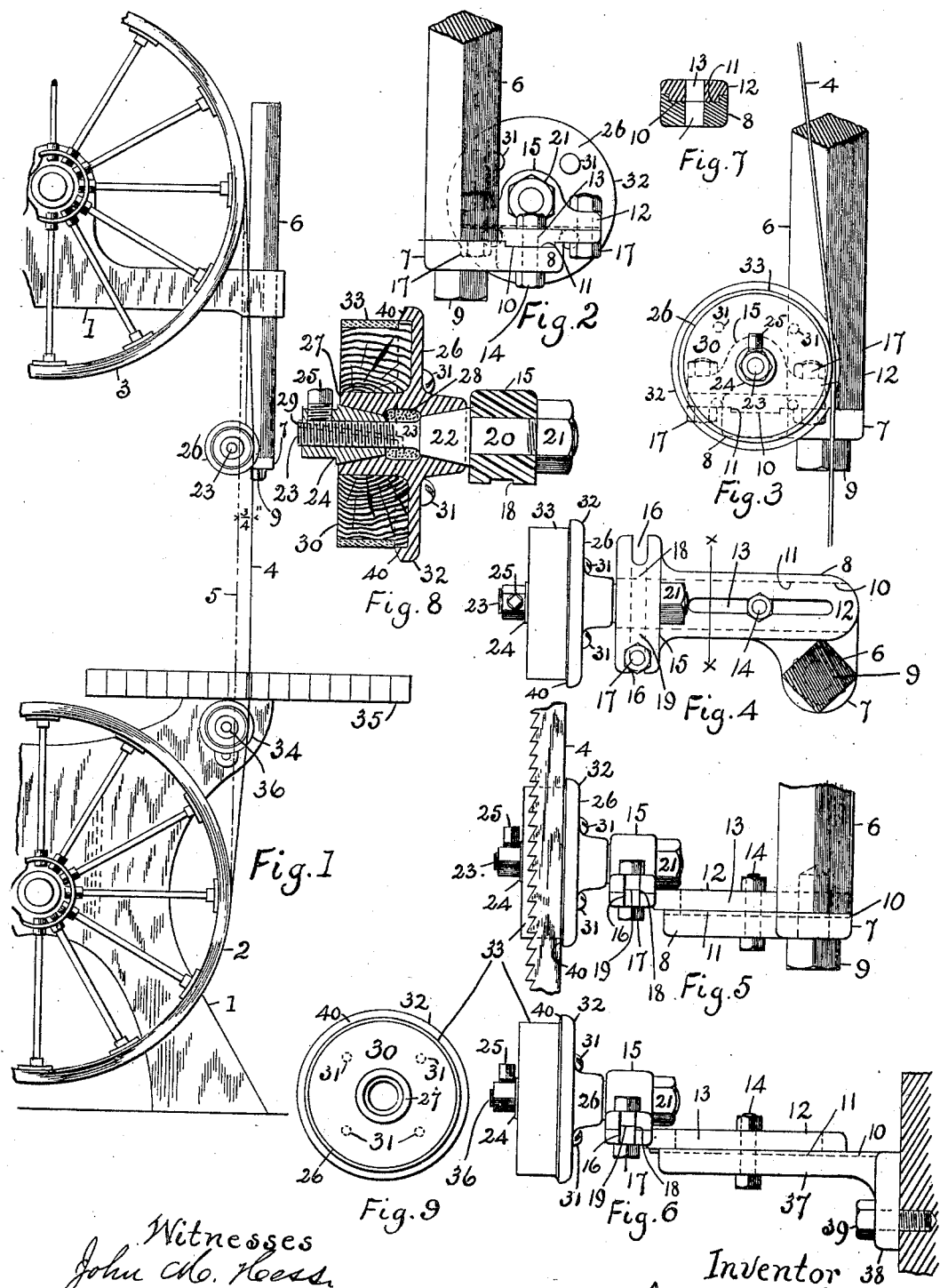
Witnesses
John M. Hess
C. C. Clifford
Inventor
Arcangelo Gillarduzzi
By R. Albright
Atty.

UNITED STATES PATENT OFFICE.

ARCANGELO GILLARDUZZI, OF PHILADELPHIA, PENNSYLVANIA.

BAND-SAW GUIDE AND TENSION DEVICE.

SPECIFICATION forming part of Letters Patent No. 697,711, dated April 15, 1902.

Application filed June 5, 1901. Serial No. 63,180. (No model.)

*To all whom it may concern:*

Be it known that I, ARCANGELO GILLARDUZZI, a citizen of the United States, residing at Philadelphia, in the county of Philadelphia and State of Pennsylvania, have invented certain new and useful Improvements in Band-Saw Guide and Tension Devices, of which the following is a specification.

My invention relates to improvements in band-saw machines, and has for its object the free guiding and putting in tension the saw in manner to overcome the objections of mechanisms heretofore in use, which so closely clamped the delicate saws which it is necessary to use, so that they are frequently broken when the piece being sawed causes a bend in the saw as the piece is turned on the saw in following lines having sharp and short curves. The close clamping which prevents the free turning of the saw is completely overcome by my mechanism, where the saw is in no manner clamped, but is guided with only one of its sides, which runs freely, riding on a revolving surface, which receives its motion from the saw, and therefore moves at the same surface speed and without friction between the saw and its guide. The saw is also backed by a revolving surface. With my mechanism the tension on the saw is only partially produced by the separation of the saw's driving and carrier pulleys, the full tension being effected by my guides, which permit a long, gradual, and easy twisting of the saw, when necessary, between the face of the upper or carrier and the face of the lower or driving pulley. I also provide adjusting means to vary the tension on the saw and to back saws of various widths, together with means to take up any wear and prevent lost motion being produced by the wear of the rapidly-revolving parts of the mechanism, and also means for their automatic lubrication.

My mechanism is illustrated in the accompanying drawings, in which—

Figure 1 is a general view in elevation of so much of a band-saw machine as is necessary to show the application of my improvements thereto. Fig. 2 is a rear end view of the upper guide. Fig. 3 is a front end view of the upper guide. Fig. 4 is a plan view of the upper guide. Fig. 5 is a side elevation of the upper guide. Fig. 6 is a side elevation of the lower guide. Fig. 7 is a section on line $xx$, Fig. 4. Fig. 8 is a central vertical section of the guide-wheels, showing their spindle, take-up mechanism, and automatic lubricating means. Fig. 9 is a front view of the guide-wheels.

Similar figures of reference indicate similar parts throughout the views.

The machine to which my mechanism applies has a framework 1, of which only a portion of the lower and upper parts are shown, (the parts being integrally connected.) A driving-wheel 2 and a carrier 3 are supported on the frame 1, and in most machines the wheel 3 has means for its vertical adjustment and whereby the saw is put in tension. On the periphery of wheels 2 3 the saw 4 is carried, and it has heretofore been the practice to have the saw follow the broken line 5 in a direct vertical line from the face of wheel 2 to the face of wheel 3; but with my guide and tension device the saw's course is deflected about three-fourths of an inch outward from the direct line 5 and parallel therewith from guide to guide, as seen in Fig. 1, to insure its tension over the guide-wheels and permit a long and gradual turn of the saw-blade in following curved lines with quick turns to eliminate the liability of breakages usual where guides are used which prevent the twisting of the saw at its guiding-points, and thereby cause side strains which result in fractures, owing to the high temper and delicacy of the saws. In the upper part of frame 1 is a bar 6, fitted for vertical movement to enable its lower end and the attached upper guide to be brought near the piece of stuff being operated on by saw 4. To the lower end of bar 6 is attached lug 7 of arm 8 by a tap-bolt 9. A groove 10 is formed in the upper surface of arm 8, into which enters tongue 11 of bearer 12 of the guide, which has a central slot 13, through which and through arm 8 a bolt 14 is passed. This construction permits bearer 12 to be adjusted on arm 8 to suit saws of various widths and to properly locate them on the face of pulleys 2 3. Mounted on the outer end of bearer 12 is a box 15, having slotted ends 16, corresponding to similar slots in bearer 12, and through these slots bolts 17 are inserted and hold the box to the arm, but permit its adjusting movement across bearer 12. A groove 18 is formed in the bottom of box 15 and fits over a tongue 19, made on bearer 12, thus providing for accurate cross movement. Within box 15 is secured end 20 of the guide-wheel spindle by nut 21, and beyond part 20 the spindle has a conical part 22, the base of which abuts box 15 and at its coned or smaller end adjoins part 23, which is of uniform diameter, somewhat smaller than the small end of the coned part, has a thread cut on its outer end, and thereon is screwed conical sleeve 24 in reverse position from conical part 22 and has a hexagonal-formed outer end, whereby it may be turned on the screw-thread for adjustment, and is provided with a set-screw 25, whereby it is secured in its proper adjustment. A guide-wheel 26 is placed upon the spindle described, and the central part of its hub 27 is made of larger diameter than part 23 of the spindle which it surrounds, and the space thus provided forms an oil-reservoir 28, fed through hole 29 from the outer end of the spindle. Ample space is provided in the reservoir 28 for the introduction of waste or other absorbent, so that an automatic feeding means is provided for lubricating the guide-wheel and its spindle. Each way from the central part of hub 27 outwardly it is bored conical to suit the coned part 22 of the spindle and the conical sleeve 24. Thus it will be seen bearing-surfaces of large diameter are provided for the guide-wheels, means whereby the tendency to move along the spindle is overcome, and also to take up any wear. Surrounding hub 27 is a body 30, of wood or material equally well adapted for retaining an adhesive, secured by screws 31 and shutting into a pocket formed under flange 32, and upon the outer diameter of body 30 is a covering 33, of leather, rubber, or similar material, which may be cemented or otherwise secured to body 30. Lower guide-wheel 34 is secured to the lower part of frame 1 under table 35 on a spindle 36, the construction of the upper and lower guide-wheels and their spindles and also the adjustments for the same being identical, as are also the boxes and bearers therefor; but the arm 37, while being grooved the same as arm 8 to receive its bearer, is not secured the same, but has a foot 38 and bolts 39, by which it is secured to frame 1. Flange 32 has its outer edge 40, against which the back of saw 4 runs, slightly tapered from body part 30 outward.

I claim—

1. The combination in a band sawing-machine, of pulleys; a band-saw supported by the pulleys; guide and tension wheels each composed of a metallic flange and hub, a non-metallic disk and a soft covering applied to the periphery of the disk; and adjustable supports for the said wheels.

2. The combination in a band sawing-machine, of pulleys; a band-saw; rotary guide and tension wheels, each wheel having a metallic rim and hub, and a non-metallic disk, said hub being provided with double conical bearing-surfaces; and a spindle for each wheel having double conical bearings for the hub and one of said bearings adjustable; the said hub being provided with an open space for the reception of a lubricant.

3. In a band sawing-machine, rotary guide and tension wheels having a metallic hub, back and narrow rim, a pocket formed by the parts aforesaid, and therein inserted and held, a non-metallic block having properties to retain cement or other adhesive substance.

4. In a band sawing-machine, metallic guide and tension wheels having a non-metallic body secured thereto, and covered with leather or like material upon the parts of the wheels in contact with the saw side, and a metallic edge raised around one edge of the cover aforesaid against which the saw's back edge may rest when resisting pressure against its cutting edge or teeth.

5. The combination in a band sawing-machine, of pulleys; a band-saw supported by the pulleys; guide and tension wheels located above and below the table; and means for adjusting each wheel in two directions in a horizontal plane; each of the adjusting means comprising an arm with a groove 10, a bearer 12 with a tongue 11, and a bolt 14, for adjusting the wheel relative to the back edge of the saw; and a box 15 with a groove 18 fitting a tongue on bearer 12 and clamping-bolts, for adjusting the wheel relative to the flat side of the saw; said box 15 supporting a spindle with a free end upon which is located the guiding-wheel.

In testimony whereof I affix my signature in presence of two witnesses.

ARCANGELO GILLARDUZZI.

Witnesses:
W. H. ALCOCK,
R. C. WRIGHT.